＝

US010829588B2

(12) United States Patent
Fleischhaker et al.

(10) Patent No.: US 10,829,588 B2
(45) Date of Patent: Nov. 10, 2020

(54) CURABLE COMPOSITIONS

(71) Applicant: BASF SE, Ludwigshafen (DE)

(72) Inventors: Friederike Fleischhaker, Ludwigshafen (DE); Andrea Misske, Speyer (DE); Christoph Fleckenstein, Freigericht-Somborn (DE); Miran Yu, Worms (DE); Martin Kaller, Mannheim (DE); Uwe Meisenburg, Bruehl (DE)

(73) Assignee: BASF SE (DE)

( * ) Notice: Subject to any disclaimer, the term of this patent is extended or adjusted under 35 U.S.C. 154(b) by 49 days.

(21) Appl. No.: 15/742,675

(22) PCT Filed: Jun. 22, 2016

(86) PCT No.: PCT/EP2016/064411
§ 371 (c)(1),
(2) Date: Jan. 8, 2018

(87) PCT Pub. No.: WO2017/005491
PCT Pub. Date: Jan. 12, 2017

(65) Prior Publication Data
US 2018/0201722 A1 Jul. 19, 2018

Related U.S. Application Data

(60) Provisional application No. 62/190,279, filed on Jul. 9, 2015.

(51) Int. Cl.
*C08G 59/56* (2006.01)
*C08G 59/58* (2006.01)
*C08G 59/50* (2006.01)

(52) U.S. Cl.
CPC ............ *C08G 59/56* (2013.01); *C08G 59/50* (2013.01); *C08G 59/58* (2013.01)

(58) Field of Classification Search
CPC ......... C08G 59/56; C08G 59/50; C08G 59/58
USPC ...................................... 528/111
See application file for complete search history.

(56) References Cited

U.S. PATENT DOCUMENTS

| 3,781,379 | A | 12/1973 | Theodore et al. |
| 4,051,195 | A | 9/1977 | McWhorter |
| 4,091,048 | A | 5/1978 | Labana et al. |
| 4,181,642 | A | 1/1980 | Hölle et al. |
| 4,835,241 | A | 5/1989 | Waddill |
| 4,853,433 | A * | 8/1989 | Blum .................. C08L 51/003 |
| | | | 525/65 |
| 5,087,647 | A | 2/1992 | Flakus |
| 5,981,627 | A | 11/1999 | Shih et al. |
| 9,695,136 | B2 | 7/2017 | Misske et al. |
| 9,776,946 | B2 | 10/2017 | Riondel et al. |
| 2014/0114022 | A1 * | 4/2014 | Dettloff ................ C08G 59/226 |
| | | | 525/113 |
| 2016/0186220 | A1 | 6/2016 | Fleckenstein et al. |
| 2016/0200943 | A1 | 7/2016 | Reichardt et al. |
| 2016/0251370 | A1 | 9/2016 | Misske et al. |
| 2016/0251371 | A1 | 9/2016 | Misske et al. |
| 2016/0264509 | A1 | 9/2016 | Kaller et al. |
| 2016/0272747 | A1 | 9/2016 | Fleischhaker et al. |
| 2017/0037223 | A1 | 2/2017 | Charrak et al. |
| 2017/0073446 | A1 | 3/2017 | Corten et al. |
| 2017/0189832 | A1 | 7/2017 | Fleischhaker et al. |
| 2017/0203235 | A1 | 7/2017 | Fleischhaker |
| 2017/0283363 | A1 | 10/2017 | Schraut et al. |
| 2017/0297996 | A1 | 10/2017 | Schraut et al. |
| 2017/0297997 | A1 | 10/2017 | Schraut et al. |
| 2017/0297998 | A1 | 10/2017 | Schraut et al. |

(Continued)

FOREIGN PATENT DOCUMENTS

| DE | 2214650 A1 | 10/1972 |
| DE | 2749576 A1 | 5/1979 |

(Continued)

OTHER PUBLICATIONS

International Search Report for PCT/EP2016/064411 dated Sep. 21, 2016.

(Continued)

*Primary Examiner* — David T Karst

(74) *Attorney, Agent, or Firm* — Faegre Drinker Biddle & Reath LLP

(57) ABSTRACT

A curable composition comprises a) at least one epoxide compound E having at least two epoxide groups; b) at least one amine A having at least two amine hydrogens; and c) at least one acrylic ester U; wherein the epoxide compound E comprises at least one epoxide compound E', the amine A comprises at least one amine A', and the acrylic ester U comprises at least one acrylic ester U' whose Hansen solubility parameters for the dipole forces $\delta_p$ and for the specific interactions $\delta_h$ satisfy the following conditions:

$$\sqrt{(\delta_{p(U')} - \delta_{p(E')})^2 + (\delta_{h(U')} - \delta_{h(E')})^2} \geq 1.5 \text{ and}$$

$$\sqrt{(\delta_{p(U')}^2 + \delta_{h(U')}^2)} - \sqrt{(\delta_{p(A')}^2 + \delta_{h(A')}^2)} \geq 0.$$

A suitable choice of the Hansen solubility parameters of the constituents ensures that the acrylic ester is incorporated covalently into the curing material, preventing subsequent evaporation of the diluent.

14 Claims, No Drawings

(56) References Cited

U.S. PATENT DOCUMENTS

| | | |
|---|---|---|
| 2018/0036940 A1 | 2/2018 | Fleischhaker et al. |
| 2018/0036954 A1 | 2/2018 | Fleischhaker et al. |
| 2018/0043436 A1 | 2/2018 | Chen et al. |

FOREIGN PATENT DOCUMENTS

| | | |
|---|---|---|
| EP | 0211978 A1 | 3/1987 |
| EP | 299420 A2 | 1/1989 |
| EP | 0355288 A2 | 2/1990 |
| GB | 1338204 A | 11/1973 |
| WO | WO-2012148815 A1 | 11/2012 |

OTHER PUBLICATIONS

Written Opinion of the International Searching Authority for PCT/EP2016/064411 dated Sep. 21, 2016.

\* cited by examiner

CURABLE COMPOSITIONS

CROSS-REFERENCE TO RELATED APPLICATIONS

This application is a national stage application (under 35 U.S.C. § 371) of PCT/EP2016/064411, filed Jun. 22, 2016, which claims benefit of German Application No. 102015212866.0, filed Jul. 9, 2015, and U.S. Provisional Application 62/190,279, filed Jul. 9, 2015, each of which are incorporated herein by reference in their entirety.

The invention relates to a curable composition which comprises at least one epoxide compound having at least two epoxide groups; at least one amine having at least two amine hydrogens; and at least one acrylic ester.

The amine groups are able to react with the epoxide groups (also called oxirane groups) in order to form covalent bonds. Cured epoxide compounds are widespread on account of their outstanding mechanical and chemical properties, such as high impact toughness, high abrasion resistance, good chemical resistance, more particularly high resistance to alkalis, acids, oils, and organic solvents, high weathering stability, excellent adhesiveness to numerous materials, and high electrical insulation capacity.

The often high viscosity of epoxide compounds frequently restricts their usefulness and restricts the use of fillers, which can be used to modify the mechanical properties of the cured resin material. In many cases, moreover, the use of fillers allows a reduction to be achieved in the costs of the products manufactured from the resins, such as moldings or coatings, for example. Oftentimes, therefore, the uncured epoxide compound is admixed with diluents, which lower its viscosity to the level desired for the application.

The presence of unreactive diluents leads to unwanted evaporation of organic solvents from the cured epoxide compound. Proposals have therefore been made to use reactive diluents for the reduction in viscosity. Reactive diluents are solvents which have functional groups that react with the epoxide groups of the epoxide compound and/or with the functional groups of the curing agent and, in so doing, form covalent bonds.

EP 0 211 978 A1 describes copolymers obtainable by mixing a first, solvent-free component, comprising a mono-, di-, or polyamine, with a second component, comprising a di- or polyfunctional acrylate and a mono-, di-, or polyepoxide. It is said that the acrylates do not react directly with the epoxides and that a polymerization reaction takes place only on mixing with an amine. Mono-, di-, or polyacrylates are therefore said to be suitable as diluents for reducing the viscosity of the epoxide compound.

WO 2012/148815 A1 describes curable compositions comprising an epoxy resin, an amine, and a polyfunctional acrylate that have defined equivalent weights.

U.S. Pat. No. 4,835,241 describes epoxy resin compositions which are the reaction product of an aromatic epoxy resin, mixed with a polyfunctional acrylate, and of an amount of a polyether polyamine that is sufficient for curing.

U.S. Pat. No. 4,051,195 describes curable compositions which comprise (1) a mixture of an epoxy resin and a polyfunctional (meth)acrylate and (2) an aliphatic polyamine. The amino groups of the polyamine are able to enter into a Michael addition with the ethylenically unsaturated groups of the polyfunctional (meth)acrylate.

EP 0 355 288 A2 describes aqueous two-component systems based on epoxides and diamines, using polyfunctional acrylates, where the amine component reacts both with the epoxide component and also with the polyfunctional acrylate component.

It has now been found that in many cases acrylic esters do not participate fully in the polyaddition reaction. Unreacted acrylic esters may evaporate from the cured composition over a relatively long time, this being undesirable in view of the irritative and/or toxic nature of the majority of acrylic esters. The accompanying use of polyfunctional acrylic esters in the known curable compositions may lead, furthermore, to changes in the properties of the resulting epoxy resins, since, for example, the polyfunctional acrylic esters incorporate additional crosslinking sites into the growing copolymer.

An object of this invention, therefore, was to provide a curable composition which after having been cured exhibits substantially no diluents evaporation. The physical properties of the cured composition, moreover, are intended not necessarily to differ substantially from cured compositions without reactive diluents.

The object is achieved by means of a curable composition which comprises a) at least one epoxide compound E having at least two epoxide groups;

b) at least one amine A having at least two amine hydrogens; and c) at least one acrylic ester U;

and wherein the epoxide compound E comprises at least one epoxide compound E', the amine A comprises at least one amine A', and the acrylic ester U comprises at least one acrylic ester U', preferably a monofunctional acrylic ester U', whose Hansen solubility parameters for the dipole forces $\delta_p$ and for the specific interactions $\delta_h$ satisfy the following conditions:

$$\sqrt{(\delta_{p(U')} - \delta_{p(E')})^2 + (\delta_{h(U')} - \delta_{h(E')})^2} = \Phi_1$$

$$\Phi_1 \geq 1.5$$

and $$\sqrt{(\delta_{p(U')}^2 + \delta_{h(U')}^2)} - \sqrt{(\delta_{p(A')}^2 + \delta_{h(A')}^2)} = \Phi_2$$

$$\Phi_2 \geq 0.$$

Preferably $\Phi_1 \geq 2.0$ and more particularly $\Phi_1 \geq 2.5$. Preferably, furthermore, $\Phi_2 \geq 0.3$ and more particularly $\Phi_2 \geq 0.6$.

Besides one or more epoxide compounds E' which meet the above conditions, the epoxide compound E may comprise one or more epoxide compounds which do not meet the above conditions. The epoxide compound E consists preferably to an extent of at least 60 wt % (based on the total amount of epoxide compound E) of E', and more particularly consists entirely of E'.

Besides one or more amines A' which meet the above conditions, the amine may comprise one or more amines which do not meet the above conditions. The amine A consists preferably to an extent of at least 60 wt % (based on the total amount of amine A) of A', and more particularly consists entirely of A'.

Besides one or more acrylic esters U', preferably monofunctional acrylic esters U', which meet the above conditions, the acrylic ester may comprise one or more acrylic esters which do not meet the above conditions. The acrylic ester U consists preferably to an extent of at least 60 wt % (based on the total amount of acrylic ester U) of U', and more particularly consists entirely of U'.

The ratio of the amount of substance of the epoxide groups and acrylic ester groups to the amount of substance of amine hydrogens is preferably in the range from 0.05 to 2.0, more particularly in the range from 0.1 to 1.0.

The weight ratio of the epoxide compound E to the acrylic ester U is generally in the range from 3 to 15, preferably in the range from 5 to 12, and more preferably in the range from 7 to 10.

The amine A comprises at least two amine hydrogens. An amine hydrogen is a hydrogen atom bonded directly to a nitrogen atom of an amino group. As is known, a primary amino group carries two amine hydrogens, a secondary amino group one amine hydrogen. The amine A, accordingly, comprises at least one primary amino group or at least two secondary amino groups, or any desired combinations of primary and secondary amino groups. With preference at least 50% of the amine hydrogens come from primary amino groups.

It has been found that a suitable choice of the Hansen solubility parameters of the constituents ensures that the amine hydrogens react preferentially in a Michael addition with the available acrylate groups. The remaining amine hydrogens react with the available epoxide groups. This brings about curing of the composition. The acrylic ester is incorporated covalently into the curing material. This prevents subsequent evaporation of the diluent.

The definition and the calculation of the solubility parameters in the three-dimensional Hansen solubility space are described in C. M. Hansen: "The three dimensional solubility parameters" J. Paint Technol. 39, 105 (1967). Here, $\delta_d$ characterizes the LONDON dispersion forces, $\delta_p$ characterizes the Debye interaction forces between permanent dipoles and also the Keesom interaction forces between induced and permanent dipoles, and $\delta_h$ characterizes the specific interaction forces (hydrogen bonds, acid/base, donor/acceptor, etc.). The parameter unit of the Hansen solubility parameters is $(MPa)^{1/2}$.

For many compounds, the Hansen solubility parameters are tabulated in standard works, such as Hansen Solubility Parameters: A User's Handbook, C. M. Hansen, 2007, 2nd Edition. It is also possible to use known modeling software, such as HSPIP 3.1.25 (3rd Edition), for example, developed and marketed by C. M. Hansen, to calculate the Hansen solubility parameters based on the chemical structure of the compound. The Hansen solubility parameters used here are based on room temperature, approximately 23° C.

If the Hansen solubility parameters do not satisfy the stated conditions, then the reactivity between the constituents of the curable composition is not optimum. Hence there might be inadequate covalent incorporation of the acrylic ester during the curing of the composition, which might lead to subsequent evaporation of the acrylic ester from the cured composition.

The curable composition comprises at least one epoxide compound having at least 2 epoxide groups, as for example 2 to 10 epoxide groups. The epoxide compound preferably comprises 2 to 5 epoxide groups, more preferably 2 epoxide groups. In general the epoxide equivalent weight is in the range from about 120 to about 3000 g/equivalent, preferably in the range from about 120 to about 1000 g/equivalent, more preferably in the range from about 120 to about 200 g/equivalent. The epoxide equivalent weight is defined as the average molecular weight of the epoxide compound, divided by the average number of epoxide groups per molecule.

The epoxide compound may further comprise other functional groups, examples being hydroxyl groups, halogens, and ether groups. The epoxide compound may be saturated or unsaturated, cyclic or acyclic, aliphatic, alicyclic, aromatic, or heterocyclic.

Epoxide compounds contemplated include monomeric epoxide compounds or oligomeric epoxide compounds having more than one epoxide group per mole, also referred to as prepolymers or epoxy resins.

The epoxy resins may be liquid resins, solid resins, or mixtures thereof. Liquid resins differ from solid resins in their lower viscosity. Liquid resins, generally speaking, also have a higher fraction of epoxide groups and a correspondingly lower epoxide equivalent.

The amount of epoxide groups in typical liquid resins is customarily in the range from 120 to 200 g/equivalent, and that of the solid resins in the range from 450 to 3000 g/equivalent, calculated as epoxide equivalent according to DIN 16945.

The viscosity of the liquid resins at 25° C. is customarily in the range from 1 to 20 Pas, preferably in the range from 5 to 15 Pas. The viscosity of the solid resins at 25° C. is customarily in the 5 to 40 Pas range, preferably in the range from 20 to 40 Pas. The viscosities reported here are the values determined according to DIN 53015 at 25° C. as 40% strength solutions of the resins in methyl ethyl ketone.

In one preferred embodiment, the epoxide compound is selected from glycidyl ethers, as for example aromatic, aliphatic, and cycloaliphatic glycidyl ethers, which are prepared, for example, by etherification of aromatic, aliphatic, or cycloaliphatic polyols with an epihalohydrin (such as epichlorohydrin or epibromohydrin).

In one preferred embodiment, the epoxide compound is selected from aromatic glycidyl ethers, as for example polyglycidyl ethers of aromatic polyols. Examples thereof are the epoxide compounds (R'=CH$_3$) derived from the diglycidyl ether of bisphenol A, the epoxide compounds (R'=H) derived from bisphenol F, and the epoxide compounds (R'=SO$_2$) derived from bisphenol S, which can be described by the following general formula:

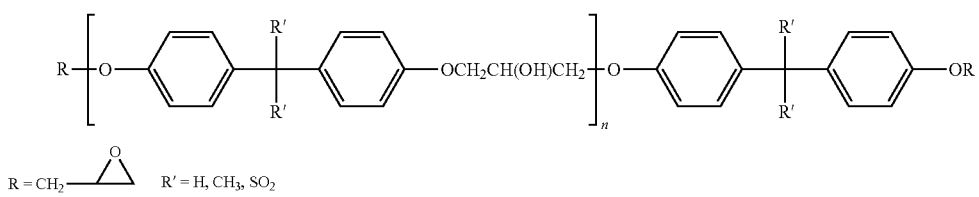

In the formula, the parameter n indicates the number of repeating units, with the average value of n corresponding to the respective average molecular weight.

Particularly preferred are the epoxide compounds (R'=CH$_3$) derived from the diglycidyl ether of bisphenol A, in which n is in the range from 0 to 10, more particularly 0 to 5. Very preferably n=0. The epoxide compound in that case is bisphenol A diglycidyl ether.

Examples of epoxide compounds based on aromatic glycidyl ethers are, furthermore, glycidyl ethers of phenol- and cresol-based novolaks. Novolaks are prepared by the acid-catalyzed condensation of formaldehyde and phenol or cresol. Reaction of the novolaks with epichlorohydrin gives the glycidyl ethers of the novolaks.

In another preferred embodiment, the epoxide compound is selected from aliphatic glycidyl ethers, examples being polyglycidyl ethers of aliphatic polyols. Examples of such polyols are alkanols such as alkanediols, alkanetriols, alkanetetraols, alkanepentaols, alkanehexaols, and also disaccharides, such as glycerol, trimethylolpropane, trimethylolethane, diglycerol, sorbitol, mannitol, pentaerythritol, dipentaerythritol, sucrose, fructose, 1,2,6-hexanetriol, glucose, lactose, and maltose, for example.

In another preferred embodiment, the epoxide compound is selected from cycloaliphatic glycidyl ethers, examples being polyglycidyl ethers of cycloaliphatic polyols. Examples of polyglycidyl ethers of cycloaliphatic polyols are the ring hydrogenation products of polyglycidyl ethers based on bisphenol A, the ring hydrogenation products of polyglycidyl ethers based on bisphenol F, the ring hydrogenation products of polyglycidyl ethers based on novolaks, and mixtures thereof. Compounds of these kinds are customarily prepared by selective hydrogenation of the aromatic rings in the aforementioned aromatic polyglycidyl ethers. Examples of such products are P 22-00 from LeunaHarze and Eponex 1510 from Hexion.

In a further preferred embodiment, the epoxide compound is selected from glycidyl esters, examples being aromatic, aliphatic, and cycloaliphatic glycidyl esters, such as polyglycidyl esters of polycarboxylic acids. The glycidyl esters are prepared, for example, by glycidylation of the polycarboxylic acids with an epihalohydrin (such as epichlorohydrin or epibromohydrin). Polyglycidyl esters of these kinds may be derived from aliphatic polycarboxylic acids, such as oxalic acid, succinic acid, glutaric acid, adipic acid, pimelic acid, suberic acid, azelaic acid, sebacic acid, dimerized or trimerized linoleic acid, for example, from cycloaliphatic polycarboxylic acid, such as tetrahydrophthalic acid, 4-methyltetrahydrophthalic acid, hexahydrophthalic acid, and 4-methylhexahydrophthalic acid, or from aromatic polycarboxylic acids, such as phthalic acid, isophthalic acid, and terephthalic acid. The glycidyl esters are selected for example from diglycidyl hexahydrophthalate, diglycidyl tetrahydrophthalate, and diglycidyl fumarate.

In a further preferred embodiment, the epoxide compound is selected from divinylarene dioxides. Suitable divinylarene dioxides include substituted or unsubstituted arenes which carry two vinyl groups in any desired positions on the ring system. The arene component of the divinylarene dioxides is selected for example from benzene, substituted benzenes, ring-fused benzenes, homologously connected (substituted) benzenes, or mixtures thereof. Ring-fused benzenes are, for example, naphthalene and tetrahydronaphthalene, for example. Homologously connected (substituted) benzenes are biphenyl and diphenyl ether, for example. The vinyl groups may be bonded in ortho, meta, or para position. Further substituents are selected for example from $C_1$-$C_{10}$ alkyls, aryls, halogens, NO$_2$, cyanate, isocyanate, or RO— (where R is a $C_1$-$C_{10}$ alkyl or an aryl).

The divinylarene dioxide is preferably selected from ortho-divinylbenzene dioxide, meta-divinylbenzene dioxide, and para-divinylbenzene dioxide. More preferably the divinylarene dioxide is selected from meta-divinylbenzene dioxide and para-divinylbenzene dioxide.

Also suitable as epoxide compounds, especially for curable compositions for coating-material formulations, are polyacrylate resins containing epoxide groups. They are prepared in general by copolymerization of at least one ethylenically unsaturated monomer, comprising at least one epoxide group in the molecule, more particularly in the form of a glycidyl ether group, with at least one further ethylenically unsaturated monomer that comprises no epoxide group in the molecule; preferably, at least one of the comonomers is an ester of acrylic acid or methacrylic acid.

Examples of the ethylenically unsaturated monomers which comprise at least one epoxide group in the molecule are glyciclyl acrylate, glycidyl methacrylate, and allyl glycidyl ether. Examples of ethylenically unsaturated monomers which comprise no epoxide group in the molecule are alkyl esters of acrylic and methacrylic acid which comprise 1 to 20 carbon atoms in the alkyl radical, more particularly methyl acrylate, methyl methacrylate, ethyl acrylate, ethyl methacrylate, butyl acrylate, butyl methacrylate, 2-ethylhexyl acrylate, and 2-ethylhexyl methacrylate. Further examples of ethylenically unsaturated monomers which comprise no epoxide groups in the molecule are acids, such as acrylic acid and methacrylic acid, for example, acid amides, such as acrylamide and methacrylamide, for example, vinylaromatic compounds, such as styrene, methylstyrene, and vinyltoluene, nitriles, such as acrylonitrile and methacrylonitrile, vinyl and vinylidene halides, such as vinyl chloride and vinylidene fluoride, vinyl esters, such as vinyl acetate, for example, and hydroxyl-containing monomers, such as hydroxyethyl acrylate and hydroxyethyl methacrylate, for example.

The polyacrylate resin containing epoxide groups customarily has an epoxide equivalent weight of 400 to 2500, preferably 500 to 1500, more preferably 600 to 1200. The number-average molecular weight (determined by gel permeation chromatography using a polystyrene standard) is typically in the range from 1000 to 15 000, preferably from 1200 to 7000, more preferably from 1500 to 5000. The glass transition temperature ($T_g$) is typically in the range from 30 to 80° C., preferably from 40 to 70° C., more preferably from 50 to 70° C. (measured by means of differential scanning calorimetry (DSC)). Polyacrylate resins containing epoxide groups are known (cf., e.g., EP-A-299 420, DE-B-22 14 650, DE-B-27 49 576, U.S. Pat. Nos. 4,091,048, and 3,781,379). Examples of such resins are Epon 8021, Epon 8111, and Epon 8161 from Hexion.

The epoxide compounds may also derive from other epoxides (nonglycidyl ether epoxide compounds). These include, in particular, compounds, including oligomers and polymers, which have at least one, more particularly two or more epoxidized cycloaliphatic groups, more particularly 7-oxabicyclo[4.1.0]heptyl groups, which are obtainable by epoxidation of compounds having cyclohexenyl groups. Examples of the epoxidation products of compounds having at least one cycloolefinic group are 4-epoxyethyl-1,2-epoxycyclohexane and the compound of the following formula:

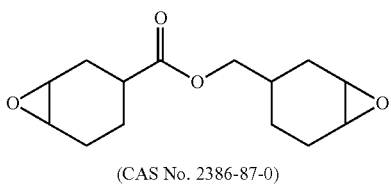

(CAS No. 2386-87-0)

which is marketed, for example, by Cytec under the name Uvacure 1500. Preference is given to using the compounds which have at least one, more particularly two or more, epoxidized cycloaliphatic groups, more particularly 7-oxabicyclo[4.1.0]heptyl groups, which are obtainable by epoxidation of compounds having cyclohexenyl groups, and oligomers thereof, not on their own, but instead in combination with one or more of the aforementioned substances which have at least two glycidyl ether groups in the molecule.

Examples of further suitable epoxide compounds are the epoxy resins available commercially under the brand names EPILOX®, EPONEX®, EPIKOTE®, EPONOL®, D.E.R, ARALDIT®, or ARACAST®.

The epoxide compound is preferably selected from glycidyl ethers, glycidyl esters, and divinylarene dioxides. More preferably the epoxide compound is selected from aromatic, aliphatic, or cycloaliphatic glycidyl ethers, very preferably aromatic glycidyl ethers. Most preferably the epoxide compound is bisphenol A diglycidyl ether.

The curable composition comprises at least one amine having at least two amine hydrogens. In order to achieve substantially complete curing of the composition and as near as possible to complete covalent incorporation of the acrylic ester into said composition, the ratio of the amount of substance of the epoxide groups and acrylic ester groups to the amount of substance of amine hydrogens is preferably in the range from 0.05 to 2.0, more particularly in the range from 0.1 to 1.0.

The amine is preferably selected from aromatic, aliphatic, or cycloaliphatic amines which have at least two amino groups which are primary and/or secondary. The amine may comprise further functional groups, examples being hydroxyl groups, halogens, and ether groups.

Examples of suitable amines A are aliphatic polyamines such as ethylenediamine, 1,2- and 1,3-propanediamine, neopentanediamine, hexamethylenediamine, octamethylenediamine, 1,10-diaminodecane, 1,12-diaminododecane, diethylenetriamine, triethylenetetramine, tetraethylenepentamine, trimethylhexamethylenediamine, 1-(3-aminopropyl)-3-aminopropane, 1,3-bis(3-aminopropyl)propane, and 4-ethyl-4-methylamino-1-octylamine;

cycloaliphatic diamines, such as 1,2-diaminocyclohexane, 1,3-bis(aminomethyl)cyclo-hexane, 1-methyl-2,4-diaminocyclohexane, 4-(2-aminopropan-2-yl)-1-methylcyclohexan-1-amine, isophoronediamine, 4,4'-diaminodicyclohexylmethane, 3,3'-dimethyl-4,4'-diaminodicyclohexylmethane, 4,8-diaminotricyclo[5.2.1.0]decane, norbornanediamine, menthanediamine, and menthenediamine; preferably isophoronediamine;

aromatic diamines, such as tolylenediamine, xylylenediamine, especially meta-xylylenediamine, bis(4-aminophenyl)methane (MDA or methylenedianiline), and bis(4-aminophenyl) sulfone (also known as DADS, DDS, or dapsone);

cyclic polyamines, such as piperazine and N-aminoethylpiperazine;

polyetheramines, especially difunctional and trifunctional primary polyetheramines based on polypropylene glycol, polyethylene glycol, polybutylene oxide, poly(1,4-butanediol), poly-THF or polypentylene oxide, e.g., 4,7,10-trioxatridecane-1,3-diamine, 4,7,10-trioxatridecane-1,13-diamine, 1,8-diamino-3,6-dioxaoctane (XTJ-504 from Huntsman), 1,10-diamino-4,7-dioxadecane (XTJ-590 from Huntsman), 1,12-diamino-4,9-dioxadodecane (BASF SE), 1,3-diamino-4,7,10-trioxatridecane (BASF), primary polyetheramines based on polypropylene glycol having an average molar mass of 230 such as, for example, polyetheramine D 230 (BASF SE) or Jeffamine® D 230 (Huntsman), difunctional, primary polyetheramines based on polypropylene glycol having an average molar mass of 400, e.g., polyetheramine D 400 (BASF SE) or Jeffamine® XTJ 582 (Huntsman), difunctional, primary polyetheramines based on polypropylene glycol having an average molar mass of 2000 such as, for example, polyetheramine D 2000 (BASF SE), Jeffamine® D2000 or Jeffamine® XTJ 578 (Huntsman), difunctional, primary polyetheramines based on propylene oxide having an average molar mass of 4000 such as, for example, polyetheramine D 4000 (BASF SE), trifunctional, primary polyetheramines prepared by reacting propylene oxide with trimethylolpropane followed by an amination of the terminal OH groups, having an average molar mass of 403, such as, for example, polyetheramine T 403 (BASF SE) or Jeffamine® T 403 (Huntsman), trifunctional, primary polyetheramine prepared by reacting propylene oxide with glycerol, followed by an amination of the terminal OH groups, having an average molar mass of 5000, such as, for example, polyetheramine T 5000 (BASF SE) or Jeffamine® T 5000 (Huntsman), aliphatic polyetheramines constructed from a propylene oxide-grafted polyethylene glycol and having an average molar mass of 600, such as, for example, Jeffamine® ED-600 or Jeffamine® XTJ 501 (each Huntsman), aliphatic polyetheramines constructed from a propylene oxide-grafted polyethylene glycol and having an average molar mass of 900, such as, for example, Jeffamine® ED-900 (Huntsman), aliphatic polyetheramines constructed from a propylene oxide-grafted polyethylene glycol and having an average molar mass of 2000, such as, for example, Jeffamine® ED-2003 (Huntsman), difunctional, primary polyetheramines prepared by amination of a propylene oxide-grafted diethylene glycol, having an average molar mass of 220, such as, for example, Jeffamine® HK-511 (Huntsman), aliphatic polyetheramines based on a copolymer of poly(tetramethylene ether glycol) and polypropylene glycol having an average molar mass of 1000 such as, for example, Jeffamine® XTJ-542 (Huntsman), aliphatic polyetheramines based on a copolymer of poly (tetramethylene ether glycol) and polypropylene glycol having an average molar mass of 1900, such as, for example, Jeffamine®:XTJ-548 (Huntsman), aliphatic polyetheramines based on a copolymer of poly(tetramethylene ether glycol) and polypropylene glycol having an average molar mass of 1400 such as, for example, Jeffamine® XTJ-559 (Huntsman), polyethertriamines based on a butylene oxide-grafted alcohol having a functionality of at least three, having an average molar mass of 400, such as, for example, Jeffamine® XTJ-566 (Huntsman), aliphatic polyetheramines prepared by amination of butylene oxide-grafted alcohols having an average molar mass of 219, such as, for example, Jeffamine® XTJ-568 (Huntsman), polyetheramines based on pentaerythritol and propylene oxide having an average molar mass of 600 such as, for example, Jeffamine® XTJ-616 (Huntsman), polyetheramines based on triethylene glycol having an average molar mass of 148, e.g., Jeffamine® EDR-148 (Huntsman), difunctional, primary polyetheramines prepared by amination of a propylene oxide-grafted ethylene glycol, having an average molar mass of 176, such as, for example, Jeffamine® EDR-176 (Huntsman), and also polyetheramines prepared by amination of polyTHF having an average molar mass of 250, e.g., PolyTHF-Amine 350 (BASF SE), and mixtures of these amines;

polyamidoamines (amidopolyamines) which are obtainable by reaction of polycarboxylic acids, more particularly dicarboxylic acids such as adipic acid or dimeric fatty acids (e.g., dimeric linoleic acid), with low molecular mass polyamines, such as diethylenetriamine, 1-(3-aminopropyl)-3-aminopropane or triethylenetetramine, or other diamines such as the aforementioned aliphatic or cycloaliphatic diamines, or alternatively are obtainable by Michael addition of diamines with acrylic esters, and subsequent polycondensation of the resulting amino acid esters; or phenalkamines (also phenolalkanamines), meaning phenol or phenol derivatives which are substituted on at least one C atom of the ring system by hydrocarbon groups which comprise primary or secondary amino groups; apart from the hydroxyl group of the phenol or phenol derivative and the primary or secondary amino groups, the phenalkamines comprise no other functional groups. More particularly the phenalkamines comprise both primary and secondary amino groups. Highly suitable phenalkamines comprise preferably a total of 2 to 10, more particularly 2 to 8, and, in one particular embodiment, 4 to 6 such amino groups; phenalkamines in question are preferably those based on cardanol, which is comprised in cashew nut shell oil; cardanol-based phenalkamines are substituted on at least one, preferably on one to three C atoms of the ring system, by above-described, preferably aliphatic hydrocarbon groups comprising primary or secondary amino groups. These substituents are located more particularly in ortho- or para-position to the hydroxyl group; phenalkamines can be prepared by Mannich reaction from the phenol or phenol derivative, an aldehyde, and a compound having at least one primary or secondary amino group. The phenalkamines are therefore Mannich bases or adducts of amino compounds, more particularly one of the above amino compounds, with epoxide compounds, and also mixtures of the aforesaid amine curing agents.

More preferably the amine is a cycloaliphatic diamine. Very preferably the amine is isophoronediamine.

The curable composition comprises at least one acrylic ester U', preferably a monofunctional acrylic ester U'. The acrylic ester reacts with the amine in a Michael addition and is thus incorporated covalently into the curing material. The term "monofunctional" here means that the acrylic ester has only one acrylate group ($H_2C=CH-COO\sim$). The term "polyfunctional" here means that the acrylic ester has at least two acrylate groups ($H_2C=CH-COO\sim$).

Besides one or more acrylic esters U' which satisfy the conditions according to the invention, the acrylic ester U may comprise one or more acrylic esters which do not satisfy the conditions according to the invention.

In certain embodiments, the fraction of polyfunctional acrylic esters in the curable compound is less than 10 wt %, based on the total weight of the curable compound.

The fraction of polyfunctional acrylic esters in the curable compound is preferably less than 5 wt %, more preferably less than 2 wt %. Very preferably the curable compound comprises substantially no polyfunctional acrylic ester.

Besides the acrylate group, the acrylic ester may comprise further functional groups, in order to satisfy the conditions imposed with regard to the Hansen solubility parameters. The acrylic ester preferably comprises at least one hydroxyl group, at least one ether group, at least one alkyloxycarbonyl group, at least one amide group and/or at least one amine group.

In one preferred embodiment, the acrylic ester is selected from hydroxyalkyl acrylic esters, alkyl ester acrylic esters, hydroxyalkyl ester acrylic esters, and polyalkyl ether acrylic esters. More preferably the acrylic ester is selected from 4-hydroxybutyl acrylate, hydroxyethylcaprolactone acrylate, and ethyl diglycol acrylate.

In one preferred embodiment, the epoxide compound E' is bisphenol A diglycidyl ether, the amine A' is isophoronediamine, and the acrylic ester U' is selected from 4-hydroxybutyl acrylate, hydroxyethylcaprolactone acrylate, and ethyldiglycol acrylate, more preferably from 4-hydroxybutyl acrylate and hydroxyethylcaprolactone acrylate.

Very preferably the epoxide compound E' is bisphenol A diglycidyl ether, the amine A' is isophoronediamine, and the acrylic ester U' is 4-hydroxybutyl acrylate.

The curable composition may further comprise inert organic solvents as diluents. This term refers to organic solvents which under atmospheric pressure have a boiling point of below 200° C. and which do not enter into any bond-forming reaction with the functional groups of the constituents present in the composition.

Solvents of this kind are typically organic solvents, examples being ketones having preferably 3 to 8 C atoms such as acetone, methyl ethyl ketone, and cyclohexanone, esters of aliphatic carboxylic acids, preferably of acetic acid, of propionic acid, or of butanoic acid, more particularly the $C_1$-$C_6$ alkyl esters of these acids such as ethyl acetate, propyl acetate, and butyl acetate, aromatic hydrocarbons, more particularly alkyl aromatics such as, for example, toluene, mesitylene, 1,2,4-trimethylbenzene, n-propylbenzene, isopropylbenzene, cumene, or xylenes, and mixtures of alkyl aromatics, more particularly technical mixtures, of the kind available commercially, for example, as Solvesso products, aliphatic and cycloaliphatic hydrocarbons, and also alkanols having preferably 1 to 8 C atoms and cycloalkanols having preferably 5 to 8 C atoms, such as methanol, ethanol, n- and isopropanol, butanols, hexanols, cyclopentanol, and cyclohexanol.

In general, however, an effect of using inert organic solvents of this kind is that they evaporate from the composition during and after curing, a result which may be unwanted from an environmental and health standpoint.

In one preferred embodiment, therefore, the curable composition comprises less than 10 wt % of inert organic solvents, more preferably less than 5 wt %, very preferably less than 1 wt %, based on the weight of the curable composition. In one particularly preferred embodiment, the curable composition comprises substantially no inert organic solvent and is therefore "solvent-free".

Besides the aforementioned constituents, the curable composition may comprise the additives and/or fillers that are customary for such compositions.

Examples of suitable fillers are inorganic or organic particulate materials such as, for example, calcium carbonates and silicates, and also inorganic fiber materials such as glass fibers, for example. Organic fillers such as carbon fibers, and mixtures of organic and inorganic fillers, such as mixtures of glass fibers and carbon fibers or mixtures of carbon fibers and inorganic fillers, for example, may also find application. The fillers can be used in an amount of 1 to 70 wt %, based on the total weight of the composition.

Examples of suitable conventional additives encompass antioxidants, UV absorbers and light stabilizers, metal deactivators, antistats, reinforcing agents, fillers, antifogging agents, blowing agents, biocides, plasticizers, lubricants, emulsifiers, colorants, pigments, rheological agents, impact-toughness improvers, catalysts, adhesion regulators, optical brighteners, flame retardants, antidrip agents, nucleating agents, solvents, and reactive diluents, and also mixtures thereof.

The optionally employed light stabilizers or UV absorbers, antioxidants, and metal deactivators preferably have a high migration stability and temperature stability. Suitable light stabilizers/UV absorbers and metal deactivators are selected for example from groups a) to h).

a) 4,4-diarylbutadienes,
b) cinnamic esters,
c) benzotriazoles,
d) hydroxybenzophenones,
e) diphenyl cyanoacrylates,
f) oxamides,
g) 2-phenyl-1,3,5-triazines, and
h) nickel compounds.

Compounds i) to s) represent a selection of suitable stabilizers.

i) sterically hindered amines,
j) metal deactivators,
k) phosphites and phosphonites,
l) hydroxylamines,
m) nitrones,
n) amine oxides,
o) benzofuranones and indolinones,
p) thiosynergists,
q) peroxide-destroying compounds,
r) polyamide stabilizers, and
s) basic costabilizers.

The present invention further provides a method for forming a crosslinked copolymer, in which the constituents E, A, and U of the composition are mixed and heated. The method is preferably carried out by mixing and heating a first component, comprising constituent E, with a second component, comprising constituent A, where the first and/or second components comprise constituent U or portions of constituent U.

The composition can be cured by heating. Curing of the compositions of the invention takes place typically at temperatures in the range from −10 to 200° C., preferably in the range from −10 to 180° C., and more particularly in the range from −10 to 150° C.

Curing may alternatively take place, for example, with microwave induction. Curing takes place more particularly at −10 to 80° C. and, in one particularly preferred embodiment, at −10 to 40° C. or at −10 to 20° C. The fact that the curing can take place under standard ambient conditions such as room temperature and/or sunlight exposure is an advantage.

Among epoxide compositions, a fundamental distinction is made between one-component (1K) and two-component (2K) systems. In 2K systems, epoxide compound and curing agent remain separate until shortly before curing—epoxide compound and curing agent are very reactive, and therefore the curing agent is added only shortly before curing.

The method of the invention is more particularly a curing method for 2K systems. In this embodiment, the amine and/or the epoxide compound are mixed separately from one another, as first or second component, respectively, with the acrylic ester or portions of the acrylic ester, even prior to curing. The mixing of the two components takes place subsequently.

The curable compositions are suitable in principle for all applications normally employing curable 1-component or 2-component epoxide formulations, more particularly 2-component epoxide formulations. They are suitable, for example, as a binder constituent in coating or impregnating materials, as adhesives, for the production of composite materials, especially those based on carbon fiber materials or glass fiber materials, for the production of moldings, or as casting compounds, more particularly as casting compounds for the embedding, joining, or consolidation of molded parts.

Coating materials comprise, for example, paints. With the curable compositions of the invention and with the method of the invention it is possible in particular to apply scratch-resistant, protective, film-forming coatings to any desired substrates of metal, plastic, or woodbase materials.

Since the reactivity of the components with one another is comparatively high, curing can be accomplished at low temperatures, such as in the range from 0 to 50° C., for example, and more particularly in the range from 5 to 35° C. The compositions are therefore especially suitable for substrates having a large surface area, which are difficult or impossible to heat to temperatures above the ambient temperature.

This includes, in particular, the coating of floors, especially in high-traffic areas, such as for the coating of traffic areas in public buildings or of squares or for the coating of vehicle parks and incoming traffic routes, for example. The compositions of the invention are also particularly suitable for the coating of metal components and metal constructions of large surface area, such as in or on buildings or boats (marine coating), for example.

The compositions are also suitable as insulating coatings in electronic applications, such as an insulating coating for wires and cables. The compositions may likewise be employed in the production of photoresists. They are especially suitable, too, as repair paint material, in connection, for example, with the repair of pipes without disassembly (cure in place pipe (CIPP) rehabilitation). They are suitable as well for the sealing and coating of floors, however.

The compositions are also suitable as adhesives, as for example 2-component assembly adhesives. Assembly adhesives serve for the permanent bonding of shaped parts to one another. The shaped parts may be made of any desired material, examples being plastic, metal, wood, leather, or ceramic. The adhesives may also be hot melt adhesives, which are liquid and processable only at elevated temperatures. The compositions can also be used as adhesives for floorcoverings. They are also suitable as adhesives for the production of printed circuit boards (electronic circuits), by means of the SMT (surface mounted technology) process, for example.

The compositions are also suitable for producing composite materials. Composites (or composite materials) combine different materials, examples being plastics and reinforcing materials (fibers, carbon fibers), with one another.

The compositions are hence suitable, for example, for producing fibers impregnated with epoxide compounds or for producing preimpregnated yarns and fabrics produced from fibers, of the type used, for example, for the production of prepregs, which are processed further into composites. Production methods for composites include extrusion, pultrusion, winding, resin transfer molding (RTM), and resin infusion (RI) methods. In particular, the fibers and/or the yarns and fabrics produced from these methods may be impregnated with the composition of the invention and thereafter cured at an elevated temperature.

As casting compositions for embedding, joining, or consolidating shaped parts, the compositions may be used, for example, in electronic applications.

The method of the invention is also suitable as a method for coating surfaces, comprising the application of the curable composition to the surface to be coated, and the curing of said composition on said surface. In relation to the surface to be coated, there are no restrictions on this coating method. Examples of suitable surfaces are metal surfaces, wood surfaces, glass areas, and plastics surfaces

EXAMPLES

Hansen solubility parameters were calculated using the modeling software HSPIP 3.1.25 (3rd Edition), developed and marketed by C. M. Hansen. Table 1 indicates the Hansen solubility parameters relevant in the examples, and the values for $\Phi_1$ and $\Phi_2$ that are calculated from these parameters.

TABLE 1

|  | $\delta_d$ | $\delta_p$ | $\delta_h$ | $\Phi_1$ | $\Phi_2$ |
|---|---|---|---|---|---|
| Bisphenol A diglycidyl ether | 19.4 | 5.7 | 5.9 | — | — |
| Isophoronediamine | 16.5 | 5.4 | 8.1 | — | — |
| Benzyl alcohol | 19.3 | 6.4 | 12.6 | — | — |
| n-Butyl acrylate | 15.7 | 5.0 | 6.0 | 0.71 | −1.92 |
| 4-Hydroxybutyl acrylate | 16.2 | 12.5 | 14.1 | 10.65 | 9.11 |
| Hydroxyethylcaprolactone acrylate | 16.6 | 10.5 | 10.0 | 6.31 | 4.77 |
| Ethyl diglycol acrylate | 16.0 | 6.3 | 8.7 | 2.86 | 1.01 |

Comparative Example 1

Bisphenol A diglycidyl ether (14.0 g), isophoronediamine (3.5 g), and benzyl alcohol (2.0 g) were mixed, spread out flat in a dish (diameter: 5 cm), and heated in a vacuum drying cabinet at 80° C. for 2 hours. The glass transition temperature $T_g$ of the resulting material was 94° C.

0.1 g of the material was stored overnight in deuterated DMSO (about 0.05 g/ml) and subsequently isolated by filtration. Benzyl alcohol was detectable in the filtrate using $^1$H NMR spectroscopy.

It is evident that benzyl alcohol has been leached from the material.

Inventive Example 1

Bisphenol A diglycidyl ether (14.0 g), isophoronediamine (3.5 g), and 4-hydroxybutyl acrylate (2.0 g) were mixed, spread out flat in a dish (diameter: 5 cm), and heated in a vacuum drying cabinet at 80° C. for 2 hours. The glass transition temperature $T_g$ of the resulting material was 93° C. This value is virtually identical to the $T_g$ value obtained in comparative example 1.

0.1 g of the material was stored overnight in deuterated DMSO (about 0.05 g/ml) and subsequently isolated by filtration. No 4-hydroxybutyl acrylate was detectable in the filtrate using $^1$H NMR spectroscopy.

From the comparison of inventive example 1 with comparative example 1 it is evident that the use of 4-hydroxybutyl acrylate rather than benzyl alcohol has no significant effect on the physical properties of the cured composition. It is also evident that the use of 4-hydroxybutyl acrylate as reactive diluent is not accompanied by any subsequent leaching of the diluent.

Comparative Example 2

Bisphenol A diglycidyl ether (14.0 g), isophoronediamine (3.5 g), and benzyl alcohol (1.5 g) were mixed, spread out flat in a dish (diameter: 5 cm), and heated in a vacuum drying cabinet at 80° C. for 2 hours. The glass transition temperature $T_g$ of the resulting material was 99° C.

0.1 g of the material was stored overnight in deuterated DMSO (about 0.05 g/ml) and subsequently isolated by filtration. Benzyl alcohol was detectable in the filtrate using $^1$H NMR spectroscopy.

Inventive Example 2

Bisphenol A diglycidyl ether (14.0 g), isophoronediamine (3.5 g), and 4-hydroxybutyl acrylate (1.5 g) were mixed, spread out flat in a dish (diameter: 5 cm), and heated in a vacuum drying cabinet at 80° C. for 2 hours. The glass transition temperature $T_g$ of the resulting material was 102° C.

0.1 g of the material was stored overnight in deuterated DMSO (about 0.05 g/ml) and subsequently isolated by filtration. No 4-hydroxybutyl acrylate was detectable in the filtrate using $^1$H NMR spectroscopy.

Inventive Example 3

Bisphenol A diglycidyl ether (14.0 g), isophoronediamine (4.0 g), and 4-hydroxybutyl acrylate (1.5 g) were mixed, spread out flat in a dish (diameter: 5 cm), and heated in a vacuum drying cabinet at 80° C. for 2 hours. The glass transition temperature $T_g$ of the resulting material was 106° C.

0.1 g of the material was stored overnight in deuterated DMSO (about 0.05 g/ml) and subsequently isolated by filtration. No 4-hydroxybutyl acrylate was detectable in the filtrate using $^1$H NMR spectroscopy.

Comparative Example 3

Isophoronediamine (3.5 g), and 4-hydroxybutyl acrylate (2.0 g) were mixed, spread out flat in a dish (diameter: 5 cm), and heated in a vacuum drying cabinet at 80° C. for 2 hours.

Analysis of the material by $^1$H NMR spectroscopy showed that the 4-hydroxybutyl acrylate was fully reacted with the excess of isophoronediamine present. The $^1$H NMR spectrum indicated Michael addition of the amine onto the double bond of the 4-hydroxybutyl acrylate.

Comparative Example 4

Bisphenol A diglycidyl ether (14.0 g) and 4-hydroxybutyl acrylate (2.0 g) were mixed, spread out flat in a dish (diameter: 5 cm), and heated in a vacuum drying cabinet at 80° C. for 2 hours.

Analysis of the material by 1H NMR spectroscopy gave no indications of a reaction between bisphenol A diglycidyl ether and 4-hydroxybutyl acrylate.

From the comparison of comparative example 4 with comparative example 3 it is evident that the advantage described in inventive example 1 for the use of 4-hydroxybutyl acrylate over benzyl alcohol is probably based on a covalent reaction of the 4-hydroxybutyl acrylate with the isophoronediamine.

Comparative Example 5

Bisphenol A diglycidyl ether (14.0 g), isophoronediamine (3.5 g), and benzyl alcohol (1.5 g) were mixed and the thermal kinetics were determined by dynamic scanning calorimetry (DSC) measurement. The heating rate was 5 K/min over a temperature range from room temperature to 250° C.
Result: Onset: 55.5° C.
Exothermic heat: 428.2 J/g
Peak maximum: 92.4° C.

Inventive Example 4

Bisphenol A diglycidyl ether (14.0 g), isophoronediamine (3.5 g), and 4-hydroxybutyl acrylate (1.5 g) were mixed and the thermal kinetics were determined by dynamic scanning calorimetry (DSC) measurement. The heating rate was 5 K/min over a temperature range from room temperature to 250° C.
Result: Onset: 57.9° C.
Exothermic heat: 402.4 J/g
Peak maximum: 96.4° C.

From the comparison of inventive example 4 with comparative example 5 it is evident that the use of 4-hydroxybutyl acrylate rather than benzyl alcohol has no material effect on the thermal kinetics of the mixture.

Comparative Example 6

Bisphenol A diglycidyl ether (14.0 g), isophoronediamine (3.5 g), and benzyl alcohol (1.5 g) were mixed and the viscosity of the mixture was determined as a function of time, using a plate/plate (25 mm) viscometer (MCR302, Anton Paar) with a gap width of 1 mm and a shear rate of 100 at 40° C. The viscosity initially was 280 mPas. The results are listed in table 2.

Inventive Example 5

Bisphenol A diglycidyl ether (14.0 g), isophoronediamine (3.5 g), and 4-hydroxybutyl acrylate (1.5 g) were mixed and the viscosity of the mixture was determined as a function of time, using a plate/plate (25 mm) viscometer (MCR302, Anton Paar) with a gap width of 1 mm and a shear rate of 100 $s^{-1}$, at 40° C. The viscosity initially was 290 mPas. The results are listed in table 2.

TABLE 2

|  | 500 mPa·s | 1000 mPa·s | 5000 mPa·s | 10 000 mPa·s |
|---|---|---|---|---|
| Comparative example 5 | 13.0 min | 22.7 min | 41.9 min | 49.4 min |
| Inventive example 5 | 11.5 min | 22.3 min | 46.1 min | 55.8 min |

From the comparison of inventive example 5 with comparative example 6 it is evident that the rheological properties of the polymer as well are not substantially affected by the use of 4-hydroxybutyl acrylate rather than benzyl alcohol.

Comparative Example 7

Bisphenol A diglycidyl ether (14.0 g), isophoronediamine (3.5 g), and benzyl alcohol (1.5 g) were mixed and, using a plate/plate (25 mm) viscometer (MCR302, Anton Paar) with a gap width of 1 mm and a shear rate of 100 $s^{-1}$, a measurement was made of the time at 75° C. required for the maximum loss modulus $G''_{max}$ to be achieved. This value corresponds to the minimum curing time. The results are listed in table 3.

Inventive Example 6

Bisphenol A diglycidyl ether (14.0 g), isophoronediamine (3.5 g), and 4-hydroxybutyl acrylate (1.5 g) were mixed and, using a plate/plate (25 mm) viscometer (MCR302, Anton Paar) with a gap width of 1 mm and a shear rate of 100 $s^{-1}$, a measurement was made of the time at 75° C. required for the maximum loss modulus $G''_{max}$ to be achieved. This value corresponds to the minimum curing time. The results are listed in table 3.

Inventive Example 7

Bisphenol A diglycidyl ether (14.0 g), isophoronediamine (4.0 g), and 4-hydroxybutyl acrylate (1.5 g) were mixed and, using a plate/plate (25 mm) viscometer (MCR302, Anton Paar) with a gap width of 1 mm and a shear rate of 100 $s^{-1}$, a measurement was made of the time at 75° C. required for the maximum loss modulus $G''_{max}$ to be achieved. This value corresponds to the minimum curing time. The results are listed in table 3.

TABLE 3

|  | $G''_{max}$ (75° C.) |
|---|---|
| Comparative example 7 | 54.8 min |
| Inventive example 6 | 68.4 min |
| Inventive example 7 | 48.6 min |

From the comparison of inventive example 6, inventive example 7, and comparative example 7, it is evident that the use of acrylic ester rather than benzyl alcohol in equal quantity has no material influence on the curing time.

Inventive Examples 8-1 and 8-2 and Comparative Example 8

Bisphenol A diglycidyl ether (14.0 g), isophoronediamine (3.5 g), and the diluent listed respectively in table 3 (2.0 g) were mixed, spread out flat in a dish (diameter: 5 cm), and heated in a vacuum drying cabinet at 80° C. for 2 hours. The respective glass transition temperature $T_g$ of the resulting material is listed in table 4.

0.1 g of the material was stored overnight in deuterated DMSO (about 0.05 g/ml) and subsequently isolated by filtration. The filtrate was analyzed by $^1$H NMR spectroscopy for the presence of the respective diluent. The results are listed in table 4.

TABLE 4

| # | Diluent | $T_g$ | Diluent leached |
|---|---|---|---|
| Comparative example 1 | Benzyl alcohol | 94° C. | yes |
| Inventive example 1 | 4-Hydroxybutyl acrylate | 93° C. | no |
| Inventive example 8-1 | Ethyl diglycol acrylate | 85° C. | no |
| Inventive example 8-2 | Hydroxyethylcaprolactone acrylate | 90° C. | no |
| Comparative example 8 | n-Butyl acrylate | 76° C. | yes |

It is evident that the use of different acrylic esters meeting the conditions according to the invention, rather than benzyl alcohol, has no material influence on the physical properties of the cured composition. It is evident, moreover, that the use of different acrylic esters meeting the conditions according to the invention does not result in any subsequent leaching of the diluent, this being an advantage over the common, unreactive solvent benzyl alcohol.

In the case of comparative example 8, leaching of the n-butyl acrylate was observed. Isophoronediamine appears to tend to react more with the bisphenol A diglycidyl ether than with n-butyl acrylate.

Comparative Example 9

Isophoronediamine (3.5 g) and ethyl diglycol acrylate (2.0 g) were mixed, spread out flat in a dish (diameter: 5 cm), and heated in a vacuum drying cabinet at 80° C. for 2 hours.

Analysis of the material by $^1$H NMR spectroscopy showed that the ethyl diglycol acrylate was fully reacted with the excess of isophoronediamine present. The $^1$H NMR spectrum indicated Michael addition of the amine onto the double bond of the ethyl diglycol acrylate.

From comparative example 9 it is apparent that the advantage described in inventive example 8-1 for the use of ethyl diglycol acrylate over benzyl alcohol is probably based on a covalent reaction of the ethyl diglycol acrylate with the isophoronediamine.

Comparative Example 10

Isophoronediamine (3.5 g) and hydroxyethylcaprolactone acrylate (2.0 g) were mixed, spread out flat in a dish (diameter: 5 cm), and heated in a vacuum drying cabinet at 80° C. for 2 hours.

Analysis of the material by $^1$H NMR spectroscopy showed that the hydroxyethylcaprolactone acrylate was fully reacted with the excess of isophoronediamine present. The $^1$H NMR spectrum indicated Michael addition of the amine onto the double bond of the hydroxyethylcaprolactone acrylate.

From comparative example 10 it is apparent that the advantage described in inventive example 8-2 for the use of hydroxyethylcaprolactone acrylate over benzyl alcohol is probably based on a covalent reaction of the hydroxyethylcaprolactone acrylate with the isophoronediamine.

Comparative Example 11

Isophoronediamine (3.5 g) and n-butyl acrylate (2.0 g) were mixed, spread out flat in a dish (diameter: 5 cm), and heated in a vacuum drying cabinet at 80° C. for 2 hours.

Analysis of the material by $^1$H NMR spectroscopy showed that the n-butyl acrylate was fully reacted with the excess of isophoronediamine present. The $^1$H NMR spectrum indicated Michael addition of the amine onto the double bond of the n-butyl acrylate.

From comparative example 11 it is evident that n-butyl acrylate is capable of reacting with an amine in a Michael addition. This result supports the supposition deposited in connection with comparative example 8 that isophoronediamine tends to react more with the bisphenol A diglycidyl ether than with n-butyl acrylate.

Comparative Example 12

Bisphenol A diglycidyl ether (14.0 g) and ethyl diglycol acrylate (2.0 g) were mixed, spread out flat in a dish (diameter: 5 cm), and heated in a vacuum drying cabinet at 80° C. for 2 hours.

Analysis of the material by $^1$H NMR spectroscopy gave no indications of a reaction between bisphenol A diglycidyl ether and ethyl diglycol acrylate.

From comparative example 12 it is apparent that the advantage described in inventive example 4-1 for the use of ethyl diglycol acrylate over benzyl alcohol is probably based on a covalent reaction of the ethyl diglycol acrylate with the isophoronediamine.

Comparative Example 13

Bisphenol A diglycidyl ether (14.0 g) and hydroxyethylcaprolactone acrylate (2.0 g) were mixed, spread out flat in a dish (diameter: 5 cm), and heated in a vacuum drying cabinet at 80° C. for 2 hours.

Analysis of the material by $^1$H NMR spectroscopy gave no indications of a reaction between bisphenol A diglycidyl ether and hydroxyethylcaprolactone acrylate.

From comparative example 13 it is apparent that the advantage described in inventive example 4-2 for the use of hydroxyethylcaprolactone acrylate over benzyl alcohol is probably based on a covalent reaction of the hydroxyethylcaprolactone acrylate with the isophoronediamine.

Comparative Example 14

Bisphenol A diglycidyl ether (14.0 g) and n-butyl acrylate (2.0 g) were mixed, spread out flat in a dish (diameter: 5 cm), and heated in a vacuum drying cabinet at 80° C. for 2 hours.

Analysis of the material by $^1$H NMR spectroscopy gave no indications of a reaction between bisphenol A diglycidyl ether and n-butyl acrylate.

Comparative Example 15

Bisphenol A diglycidyl ether (14.0 g), isophoronediamine (3.5 g), and n-butyl acrylate (1.5 g) were mixed, spread out flat in a dish (diameter: 5 cm), and heated in a vacuum drying cabinet at 80° C. for 2 hours.

0.1 g of the material was stored overnight in deuterated DMSO (about 0.05 g/ml) and subsequently isolated by filtration. n-Butyl acrylate was detectable in the filtrate using $^1$H NMR spectroscopy.

Comparative Example 16

Bisphenol A diglycidyl ether (14.0 g), isophoronediamine (4.0 g), and n-butyl acrylate (1.5 g) were mixed, spread out flat in a dish (diameter: 5 cm), and heated in a vacuum drying cabinet at 80° C. for 2 hours.

0.1 g of the material was stored overnight in deuterated DMSO (about 0.05 g/ml) and subsequently isolated by filtration. n-Butyl acrylate was detectable in the filtrate using NMR spectroscopy.

From comparative examples 15 and 16 relative to comparative example 8 it is evident that even in the case of relatively large amounts of amine, there is insufficient covalent incorporation of the n-butyl acrylate in the course of the curing of the composition.

It is evident that the use of the curable composition of the invention rather than curable compositions which comprise diluents such as benzyl alcohol or n-butyl acrylate permits covalent incorporation of the acrylic ester in the course of the curing of the composition.

What is claimed is:

1. A curable composition comprising:
   a) at least one epoxide compound E having at least two epoxide groups;
   b) at least one amine A having at least two amine hydrogens; and
   c) at least one acrylic ester U;
   wherein the epoxide compound E comprises at least one epoxide compound E', the amine A comprises at least one amine A', and the acrylic ester U comprises at least one monofunctional acrylic ester U' comprising at least one hydroxyl group, at least one ether group, at least one amide group, and/or at least one amine group, whose Hansen solubility parameters for the dipole forces $\delta_p$ and for the specific interactions $\delta_h$, satisfy the following conditions:

$$\sqrt{(\delta_{p(U')} - \delta_{p(E')})^2 + (\delta_{h(U')} - \delta_{h(E')})^2} \geq 1.5 \text{ and}$$

$$\sqrt{(\delta_{p(U')}^2 + \delta_{h(U')}^2)} - \sqrt{(\delta_{p(A')}^2 + \delta_{h(A')}^2)} \geq 0;$$

wherein $\delta_{p(U')}$, $\delta_{p(E')}$, and $\delta_{p(A')}$ are the Hansen solubility parameters for the dipole forces for the at least one acrylic ester, the at least one epoxide compound, and the at least one amine, respectively, and $\delta_{h(U')}$, $\delta_{h(E')}$, and $\delta_{h(A')}$ are the Hansen solubility parameters for the specific interactions for the at least one acrylic ester, the at least one epoxide compound, and the at least one amine, respectively.

2. The curable composition according to claim 1, the ratio of the amount of substance of the epoxide groups and acrylic ester groups to the amount of substance of amine hydrogens being in the range from 0.05 to 2.0.

3. The curable composition according to claim 2, the ratio of the amount of substance of the epoxide groups and acrylic ester groups to the amount of substance of amine hydrogens being in the range from 0.1 to 1.0.

4. The curable composition according to claim 1, the epoxide compound E' being selected from the group consisting of glycidyl ethers, glycidyl esters, divinylarene dioxides, and polyacrylate resins containing epoxide groups.

5. The curable composition according to claim 4, the epoxide compound E' being selected from the group consisting of aromatic, aliphatic, and cycloaliphatic glycidyl ethers.

6. The curable composition according to claim 5, the epoxide compound E' being selected from aromatic glycidyl ethers.

7. The curable composition according to claim 6, the epoxide compound E' being bisphenol A diglycidyl ether.

8. The curable composition according to claim 1, the amine A' being selected from aromatic, aliphatic, or cycloaliphatic amines which have at least two amino groups which are primary and/or secondary.

9. The curable composition according to claim 8, the amine A' being a cycloaliphatic diamine.

10. The curable composition according to claim 9, the amine A' being isophoronediamine.

11. The curable composition according to claim 1, the monofunctional acrylic ester U' being selected from the group consisting of hydroxyalkyl acrylic esters, hydroxyalkyl ester acrylic esters, and polyalkyl ether acrylic esters.

12. The curable composition according to claim 11, the monofunctional acrylic ester U' being selected from the group consisting of 4-hydroxybutyl acrylate, hydroxyethyl-caprolactone acrylate, and ethyl diglycol acrylate.

13. The curable composition according to claim 1, the composition comprising less than 10 wt % of inert organic solvents.

14. A method for curing a composition according to claim 1, comprising mixing the constituents of the composition.

* * * * *